3,071,572
POLYMERIZABLE MIXED ALLYL CARBOXY-
METHYL CELLULOSE ESTERS AND SALTS
THEREOF
Ingo Haidasch, Wiesbaden, and Julius Voss, Wiesbaden-
Biebrich, Germany, assignors to Kalle Aktiengesell-
schaft, Wiesbaden-Biebrich, Germany, a corporation
of Germany
No Drawing. Filed Feb. 3, 1960, Ser. No. 6,348
Claims priority, application Germany June 23, 1959
32 Claims. (Cl. 260—231)

The present invention is concerned with mixed cellulose ethers containing allyl groups. More particularly, it refers to mixed cellulose ethers characterized by good stability on storage which contain both carboxymethyl groups and allyl groups and are polymerizable by the addition of catalysts. Further, it refers to a process for the manufacture of such mixed cellulose ethers.

The object of the present invention is to provide a process for the preparation of water-soluble salts of mixed ethers of cellulose containing allyl groups and carboxymethyl groups. By the process according to the present invention, mixed cellulose ethers are easily obtained whose sodium salts show in 2% aqueous solutions viscosities ranging from 500 to 20,000 centipoises when tested in a Höppler viscosimeter at a temperature of 20° C., and when, as raw material, cellulose is used which has an average degree of polymerization from about 400 to about 1400. If celluloses are used which have a higher or lower average degree of polymerization, mixed ethers can also be obtained which have a considerably higher or lower viscosity. When, e.g., cellulose is used which has an average degree of polymerization of about 200 to about 400, mixed ethers with a low viscosity of about 5 cp. to about 500 centipoises, measured by the method stated above, can be obtained. The process of the present invention is characterized in that, at temperatures below 110° C., cellulose and a strong alkali are reacted with a halogen-substituted acetic acid or a water-soluble salt thereof and with an allyl halide.

As strong alkalis according to the present invention there may be used strong inorganic and organic basic substances, e.g., the alkali-metal hydroxides, such as sodium hydroxide, potassium hydroxide or quaternary ammonium hydroxides of the general formula [NR₄]OH in which R stands for lower alkyl, such as methyl, ethyl, propyl, butyl, lower hydroxyalkyl, such as hydroxyethyl, hydroxypropyl, and hydroxybutyl, and in which from one to two of the radicals represented by R can be aryl or aralkyl such as phenyl and benzyl.

As allyl halides according to the present invention, allyl chloride, allyl bromide and allyl iodide are useful, and allyl chloride and allyl bromide are preferred reactants.

As salts of monohalogen-substituted acetic acid according to the present invention, the alkali-metal salts of monohalogen-substituting acetic acids are preferred. Other salts may be used, e.g., the calcium salts and ammonium salts; however, in the reaction they are usually converted to the alkali-metal salts by the stronger alkali, e.g., alkali-metal hydroxides usually present in the reaction mixture. The alkali-metal salts of monochloro acetic acid, monobromo acetic acid and monoiodo acetic acid are useful for the process of the present invention, e.g., sodium monobromoacetate, potassium monochloroacetate, sodium monoiodoacetate, sodium monochloroacetate, potassium monobromoacetate.

Sodium monochloroacetate is preferably used in the process of the present invention.

The salts of the mixed cellulose ethers prepared in accordance with the present invention are distinguished by good water solubility and high viscosity. If stored, they remain water-soluble for a long time. Their solutions undergo practically no changes when they are in contact with air and become gelatinous by the addition of suitable polymerization catalysts, e.g., polymerization catalysts forming radicals, such as the redox system, which consists of a mixture of potassium persulfate and sodium sulfite. Due to these qualities, the products obtained according to the present invention may be used, e.g., as impregnators for paper to increase its grease-proofness, as textile auxiliaries, as binders or vehicles for paints and printing dyes, for adhesives and for supported and unsupported water-insoluble films and coatings. The water-insolubility of the products after the processing is a special advantage.

The process which is the object of the present invention is preferably carried out as follows:

To begin with, cellulose glycolic acid is prepared in the form of an alkali-metal salt and this salt is reacted with an allyl halide in the presence of an alkali, preferably an alkali-metal hydroxide. Alternatively, it is also possible to obtain allyl cellulose by reacting cellulose or alkali cellulose, respectively, with an allyl halide in the presence of a strong alkali. It is then reacted with the alkali-metal salt of a monohalogen-substituted acetic acid or with a monohalogen-substituted acetic acid in the presence of an alkali. Further, the invention includes also the simultaneous reaction of cellulose with an allyl halide, in the presence of an alkali, and with an alkali-metal salt of a monohalogen-substituted acetic acid.

If cellulose glycolic acid is to be used in the form of its sodium salt as the starting material for the reaction with an allyl halide, it may be prepared either by mixing, over a period from about 30 minutes to about 12 hours or more, preferably from about 30 minutes to about 5 hours, at elevated temperatures, preferably from about 30° C. to about 70° C., but not exceeding 110° C., finely divided alkali cellulose of a sodium hydroxide content of, e.g., from 1.0 to 4.0 mols with, e.g., 0.3 to 3.0 mols, of the sodium salt of a monohalogen-substituted acetic acid, e.g., sodium monochloroacetate, each of these molecular quantities being based upon a gram-molecular weight (mol) of glucose contained in the glucose unit of the cellulose, or by mixing, under the same conditions, alkali cellulose with a monohalogen-substituted acetic acid, e.g., sodium monochloroacetate in the presence of an organic solvent, e.g., a lower aliphatic alcohol with 3 to 5 carbon atoms, such as butanol. The alkali cellulose required for the process described above may be prepared in known manner, by dipping cellulose into a 20-50% sodium hydroxide (NaOH) solution and subsequent squeezing, or by spraying dry pulverized cellulose with aqueous NaOH, or by alkalizing pulverized cellulose in an inert solvent. The composition of the alkali cellulose used depends on the desired degree of etherification as well as on whether the etherification is performed with an excess of NaOH or of the etherification agent. In general, mixed ethers the salts of which have a good water-solubility are obtained when using alkali cellulose containing, per mol of glucose, 0.2 to 13 mols of alkali. Preferably, not more than about 8 mols of water per mol of alkali should be present. The introduction of the allyl groups may be effected by reaction of the carboxymethyl cellulose with an allyl halide, such as allyl chloride, allyl bromide or allyl iodide, preferably allyl choride, in the presence of a strong akali, either immediately following the reaction between alkali cellulose and an alkali salt of a monohalogen-substituted acetic acid, e.g., sodium monochloroacetate, or after the cellulose glycolic acid, in the form of its sodium salt, has been isolated, purified, and mixed again with alkali.

To obtain the preferred mixed cellulose ethers, the salts of which are water-soluble and polymerizable, cellulose allyl glycolic acid ethers are prepared in accordance with the present invention which contain from about 0.2 to about 1.0 carboxymethyl group per glucose unit of the cellulose and from about 0.1 to about 1.0 allyl group per glucose unit of the cellulose.

The cellulose allyl glycolic acid ethers of the present invention and their water-soluble salts, respectively, can be polymerized in the presence of catalysts to form water-insoluble products, provided they have a content of about 0.1 or more allyl group per glucose unit of the cellulose. With a higher substitution of the cellulose by carboxymethyl groups, the content of allyl groups should also advantageously be increased. Into a mixed ether having about 1 mol of glycolic acid per mol of glucose, from about 0.5 to about 0.8 mol of allyl group should be introduced. In order to obtain a product the salts of which have a good water-solubility, the cellulose should suitably have a certain minimum degree of substitution, namely, a total of about 0.5 of a hydroxyl group per glucose unit should be substituted by allyl and carboxy-methyl groups, and of these about 0.2 mol should be substituted by carboxy methyl groups. If the degree of substitution is lower than stated above, the water solubility of the products generally decreases, but may still be sufficient for many purposes. Particularly good qualities with regard to solubility and polymerizability are obtained with mixed ethers having a substitution degree of about 0.2 to about 0.6 mol glycolic acid group and about 0.3 to about 0.6 allyl group per glucose unit of the cellulose; such products are therefore preferred.

The formation of cellulose allyl glycolic acid mixed ethers with a specific content of allyl groups can be achieved either by the application of a calculated quantity of allyl halide with alkali in excess, or by the application of a calculated quantity of alkali with allyl halide in excess. A mixed cellulose ether having a content of from about 0.1 to about 1.0 allyl group is obtained by reacting in the presence of excess alkali, e.g., from about 0.3 to about 10.0 mols of NaOH, an alkali salt of a cellulose glycolic acid with about 0.2 to about 7.0 mols of allyl halide, all molar proportions being stated in relation to one mol of glucose contained in the glucose unit of the cellulose. Preferably, the proportion of allyl halide to alkali should not substantially exceed that of 1:2. By another method an alkali salt of a cellulose glycolic acid is first treated with about 0.2 to about 4 mols of alkali and then reacted with allyl halide in excess, preferably from about 1.5 mols to about 10 mols of allyl halide permol of alkali. Alternatively, equimolecular quantities of alkali and allyl halide may be used, the quantities being about 0.3 to about 7 mols of these reactants per mol of glucose in the cellulose.

The reactions described in the foregoing paragraph should be carried out at elevated temperatures, from about 30° C. to about 110° C. preferably from about 50° C. to about 90° C. The reaction time may be from about 30 min. to about 12 hours or more, preferably from about 30 min. to about 5 hours.

Instead of starting with a cellulose glycolic acid having a substitution degree of about 0.2 to about 1.0 and further etherifying this ether by means of an allyl halide, it is also possible to produce first a cellulose allyl ether by the reaction of cellulose, free alkali and allyl halide, and to react said cellulose allyl ether, in the presence of a free alkali, with such quantities of an alkali-metal salt of a monohalogen-substituted acetic acid that the mixed cellulose ether thus obtained has a content of carboxymethyl groups of about 0.2 to about 1.0. An etherification degree of from, e.g., 0.1 to 0.8 is achieved by reacting cellulose containing an excess of alkali, e.g., 0.4 to 10 mols, with 0.3 to 7 mols of allyl halide, all molar proportions being calculated on one mol of glucose of the cellulose. Alternatively, alkali cellulose having a content of 0.2 to 3 mols of alkali is reacted with allyl halide in excess, preferaby from about 1.5 to about 10 mols of allyl halide per mol of alkali. If cellulose is reacted with equimolecular quantities of alkali and allyl halide, the quantities of each of the two reaction components range from 0.4 to 7 mols per mol of glucose. The etherification degree of 0.2 to 1.0 to be attained during subsequent carboxymethylation is achieved by reacting allyl cellulose with an alkali content of from 1 to 7 mols with an alkali-metal salt of a monohalogen-substituted acetic acid, e.g., 0.3 to 5 mols of sodium monochloroacetate, all molar proportions being based on one mol of glucose of the cellulose.

The reactions described in the foregoing paragraph should be carried out at elevated temperatures from about 30° C. to about 110° C., preferably from about 50° C. to about 90° C. The reaction time may be from about 30 min. to about 12 hours or more, preferably from about 30 min. to about 5 hours.

As the allyl cellulose products of higher substitution degree, which are no mixed ethers, tend to form crosslinks, it is recommended to use cellulose allyl ethers having not more than about 0.8 mol of allyl group per glucose unit. Alternatively, cellulose having a content of 1.2 to 13 mols of alkali is simultaneously reacted with 0.4 to 3 mols of an alkali-metal salt of a monohalogen-substituted acetic acid, e.g., sodium monochloro acetate, and 0.3 to 7 mols of an allyl halide, e.g., allyl bromide, the alkali used being in excess of the allyl halide. Or cellulose having a content of from 1 to 7 mols of alkali is simultaneously reacted with 0.4 to 3 mols of sodium monochloroacetate and allyl halide, the allyl halide being in excess over the amount of the alkali not used for the carboxymethylation. Preferably, the amount of the allyl halide is from 1.5 to 10 mols per mol of alkali minus the mols of the sodium monochloroacetate.

The reaction described in the foregoing paragraph should be carried out at elevated temperatures from about 30° C. to about 110° C., preferably from about 50° C. to about 90° C. The reaction time may be from about 30 min. to about 12 hours or more, preferably from about 30 min. to about 5 hours.

Etherification of the cellulose is achieved by mixing the reactants, finely divided if solid substances are used, at elevated temperature. Organic solvents, such as hydrocarbons, alcohols with 3 to 5 carbon atoms, chlorinated hydrocarbons, containing at least two chlorine atoms, or alkyl ethers, may be added to the reactants. However, the organic solvents should be added only in such quantities that the reaction mixture can be sufficiently agitated. Larger quantities would considerably increase the time of reaction.

After the reaction has been performed by one of the various ways described above, the reaction product is neutralized by adding an acid, preferably an organic acid, such as acetic acid, and isolated, either by releasing an excess allyl halide in case the volatile allyl chloride is used, or by carefully distilling off the allyl halide and the solvent used. The solid reaction product is washed with lower alcohols or aqueous lower alcohols of high percentage, e.g., from 60 to 99 percent, e.g., methanol, ethanol, propanol, or isopropanol, to remove salts formed as by-products of the reaction, and then dried at elevated temperature, preferably at temperatures from about 30° C. to about 100° C. Thus the water-soluble alkali-metal salts are obtained which are preferably used. The free mixed ethers are obtained by acidifying preferably the aqueous solutions of the salts and precipitating the mixed ethers. The free mixed ether may be reacted with amines, amomnia, another alkali-metal hydroxide, alkaline-earth-metal hydroxides, or other bivalent metal hydroxides whereby water-soluble salts are obtained. It is also possible to obtain water-insoluble salts of the mixed cellulose ether by adding to the aqueous solutions of the alkali-metal salts of the mixed ether salts of trivalent metals.

Advantageously, the process of the present invention is performed at elevated temperatures. If allyl bromide is used, the temperature should be in the range of about 45° C. to about 70° C., preferably of 50° C. to 60° C. If allyl chloride is used as the etherification agent, the temperature applied should preferably be higher, i.e., up to 110° C., especially good results being obtained with temperatures ranging from about 70° C. to about 90° C. Because at temperatures exceeding 110° C. the ethers of the present invention will become highly polymerized, only temperatures below approximately 110° C. can be considered for the process of the present invention.

*Examples*

(1) 20 parts by volume of a 30 percent (by weight) sodium hydroxide solution and afterwards 7 parts by weight of sodium monochloroacetate are added to a suspension of 32.4 parts by weight of pulverized cellulose in a solvent mixture made up of 50 parts by volume of water and 450 parts by volume of isopropanol, and the reaction mixture is heated for 1 hour to 65° C. under constant agitation. When the reaction mixture has cooled, 46 parts by volume of a 30 percent (by weight) sodium hydroxide solution are added while agitating. After thoroughly mixing the reaction mixture, 400 parts by volume of isopropanol are drawn off by suction from the reaction vessel. 34.6 parts by volume of allyl bromide are added to the reaction mixture, which is then heated for another three hours to 60° C. while stirring. When the reaction mixture has cooled again, it is neutralized by adding glacial acetic acid and the sodium salt of the mixed cellulose allyl ether is filtered by suction, washed with an 80 percent methanol solution until the ether is free from salt, and finally dried at 60° C. 38 parts by weight of the sodium salt of the mixed cellulose ether are obtained. The reaction product contains 0.21 carboxymethyl group and 0.79 allyl group per glucose unit of the cellulose. It is of high viscosity and, when dissolved in water, forms a clear solution, from which the free mixed ethers, if desired, may be precipitated by adding an acid, e.g., acetic acid or hydrochloric acid. By filtering, washing with water and drying, the free mixed ethers may be isolated.

By adding a catalyst, e.g., a so-called redox system, such as a mixture of potassium persulfate and sodium sulfite, to the aqueous solution of the salt of the mixed ether, polymerization of the water-soluble mixed cellulose ether is caused. If larger quantities, e.g., from about 2 to about 5 percent calculated on the cellulose ether, of a suitable redox catalyst are added the aqueous solution gelatinizes. If only a smaller quantity of the catalyst is added to the aqueous mixed cellulose ether solution, the aqueous solutions remains liquid for some time, but a film cast from this solution onto a suitable support, e.g., a glass plate, becomes water-insoluble upon drying.

(2) 39 parts by weight of a sodium salt of cellulose glycolic acid which has been produced as described in Example 1 and purified and dried, are dispersed in a mixture made up of 450 parts by volume of isopropanol and 50 parts by volume of water. 20 parts by volume of a 30% (by weight) sodium hydroxide solution are added to the dispersion and allowed to react upon the cellulose glycolic acid for 10 minutes. Then 400 parts by volume of isopropanol are drawn off from the reaction mixture, the cellulose glycolic acid with the alkali content is mixed with 51.5 parts by volume of allyl bromide and finally heated for 3 hours to 60° C. with constant agitation. The crude etherification product is suspended in methanol, drawn off, and freed from salt by washing with methanol. 41 parts by weight of a sodium salt of a mixed cellulose ether are obtained having 0.21 carboxymethyl group and 0.72 allyl group per glucose unit of the cellulose. When dissolved in water, the salt of the mixed ether forms a clear solution. The free mixed ether may be obtained in accordance with the method described in Example 1.

In the same manner as described in Example 1 water-insoluble films can be obtained by adding a redox catalyst.

(3) 42 parts by weight of the sodium salt of a cellulose glycolic acid having an etherification degree of 0.27 carboxymethyl group per glucose unit are mixed with 100 parts by volume of isopropanol and then alkalized by adding 20 parts by volume of a 30 percent (by weight) aqueous sodium hydroxide solution. After adding 160 parts by volume of allyl chloride, while constantly agitating, the reaction mixture is heated for one hour to 85° C. in a pressure vessel provided with an outlet valve. After the reaction is complete, the surplus allyl chloride is removed through the valve, and the reaction product is then cooled in the pressure vessel. The sodium salt of mixed cellulose ether thus obtained is suspended in methanol, filtered by suction, thoroughly washed with methanol to free it from salt, and then dried at 60° C. 42 parts by weight of the sodium salt of the mixed cellulose ether containing 0.53 allyl group and 0.27 carboxymethyl group per glucose unit of the cellulose are obtained. The salt of the mixed cellulose ether forms a clear solution in water.

In the same manner as described in Example 1 water-insoluble films can be obtained by adding a redox catalyst.

(4) 35 parts by weight of a cellulose allyl ether having a content of 0.3 allyl group per glucose unit, are suspended in a mixture consisting of 450 parts by volume of isopropanol and 50 parts by volume of water and alkalized by adding 26 parts by volume of a 30% (by weight) sodium hydroxide solution. After adding 7 parts by weight of sodium monochloroacetate, the reaction mixture is heated for one hour to 65° C. After it has cooled, the reaction mixture is neutralized by adding glacial acetic acid, filtered by suction, washed free from salt by means of methanol, and dried at 60° C. 36 parts by weight of the sodium salt of the mixed cellulose ether are obtained which has a content of 0.3 allyl group and 0.21 carboxymethyl group per glucose unit of the celulose and forms a clear solution with water.

In the same manner as described in Example 1 water-insoluble films can be obtained by adding a redox catalyst.

(5) 30 parts by volume of a 30 percent (by weight) sodium hydroxide solution and afterwards 28 parts by weight of sodium monochloroacetate are added to a suspension of 32.4 parts by weight of pulverized cellulose in a solvent mixture made up of 50 parts by volume of water and 450 parts by volume of isopropanol, and the reaction mixture is heated for 1 hour to 65° C. under constant agitation. Subsequently, 144 parts by volume of a 30 percent (by weight) sodium hydroxide solution are added to the reaction mixture while agitating. After thoroughly mixing the reaction mixture, 400 parts by volume of isopropanol are distilled off in the vacuum from the reaction vessel. 121 parts by volume of allyl bromide are then added, and the reaction mixture is heated for another three hours to 60° C. while stirring. When the reaction mixture has cooled, methanol is added. Then it is neutralized by adding glacial acetic acid, filtered by suction, washed with methanol until the mixture is free from salt, and dried at 60° C. 52 parts by weight of the sodium salt of the mixed cellulose ether are obtained. The reaction product contains 0.8 carboxymethyl group and 1.0 allyl group per glucose unit of the cellulose and, when dissolved in water, forms a clear solution. By adding redox catalysts to the aqueous solution, as described in Example 1, water-insoluble films may be prepared.

(6) 20 parts by volume of a 30 percent (by weight) sodium hydroxide solution and afterwards 7 parts by weight of sodium monochloroacetate are added to a suspension of 32.4 parts by weight of pulverized cellulose in a solvent mixture made up to 50 parts by volume of water and 450 parts by volume of isopropanol, and the reaction mixture is heated for 1 hour to 65° C. under constant agitation. When the reaction mixture has cooled, it is neutralized by adding glacial acetic acid, filtered by suction, washed with an 80 percent solution of methanol in water, and then dried at 80° C.

Subsequently, the purified and dried sodium salt of cellulose glycolic acid is suspended in 500 parts by volume of the above mentioned solvent mixture. 46 parts by volume of a 30 percent (by weight) sodium hydroxide solution are added, while agitating. After thoroughly mixing the reaction mixture, 400 parts by volume of isopropanol are distilled off in the vacuum. 34.6 parts by volume of allyl bromide are then added and the reaction mixture is heated for three hours to 60° C. while stirring. When the reaction mixture has cooled methanol is added,, then it is neutralized by adding glacial acetic acid, filtered by suction, washed with methanol until the mixture is free from salt, and dried at 60° C. 35 parts by weight of the mixed cellulose ether are obtained. The reaction product contains 0.21 carboxymethyl group and 1.0 allyl group per glucose unit of the cellulose, and, when dissolved in water, forms a clear solution. By adding redox catalysts to the aqueous solution, as described in Example 1, water-insoluble films may be prepared.

(7) For the production of a water-proof coating or film, 98 parts by weight of chalk and 2 parts by weight of ocher pigment are made into a paste with 50 parts by volume of water and then mixed with 75 parts by weight of a 4 percent aqueous solution of the sodium salt of cellulose allyl glycolic acid. The mixed cellulose ether used had an etherification degree of 0.6 allyl group and 0.54 carboxymethyl group per glucose unit of the cellulose; a 2 percent aqueous solution had a viscosity of 70 centipoises, measured in a Höppler viscosimeter at 20° C. After homogeneously mixing it with 1.2 parts by volume of a 5 percent aqueous sodium sulfite solution and 0.1 part by volume of a 2.5 percent aqueous copper sulfate solution as catalyst, the distemper thus obtained was coated onto a lime mortar wall. After a week, the coating had become resistant to rubbing, i.e., the pigments could not be removed by means of a wet sponge.

(8) For the preparation of a water-proof film, 2 parts by weight of a sodium salt of cellulose allyl glycolic acid having an etherification degree of 0.45 allyl group and 0.28 carboxy methyl group per glucose unit of the cellulose were dissolved in 100 parts by volume of water at 20° C. The solution had a viscosity of 53 centipoises, measured in a Höppler viscosimeter at 20° C. After homogeneously mixing with 2.5 parts by volume of a 4 percent aqueous potassium persulfate solution and 2.5 parts by volume of a 4 percent aqueous sodium sulfite solution, a solution was obtained which gelatinized after eight hours and, when cast onto a glass plate and dried at 20° C., formed a water-insoluble film. After six days' storage the swelling value $$\left(\frac{\text{wet weight} - \text{dry weight}}{\text{dry weight}}\right)$$

amounted to 410, and after 30 days, to 160. If, instead of the quantities stated above, only 0.75 part by volume each of the catalyst were added, the solution remained liquid for three days. A film cast from this solution and dried at 20° C. had a swelling value of 2600 after 6 days' storage, and a swelling value of 770 after a storage of 30 days. Upon further storage of the film, the swelling value diminishes gradually and even with a low allyl content and the addition of only small quantities of a catalyst, swelling value of about 200 or even less can be obtained. By applying higher temperatures, films that are very resistant to swelling can be obtained even after a very short time. The swelling value obtained will be the lower, the higher the temperatures which are applied and the longer the influence of such higher temperatures. If is of particular importance that, as shown above, even at room temperature films can be obtained which are very resistant to swelling because for coating purposes only this temperature range is of practical importance.

This application is a continuation-in-part of our prior application Serial No. 843,051, filed September 29, 1959, now abandoned.

What is claimed is:

1. A polymerizable mixed ether of cellulose selected from the group consisting of mixed ethers of cellulose containing carboxymethyl groups and allyl groups, and salts thereof.

2. An alkali-metal salt of a polymerizable mixed ether of cellulose containing carboxymethyl groups and allyl groups.

3. A polymerizable mixed carboxymethyl and allyl ether of cellulose according to claim 1 containing between about 0.2 and about 1.0 carboxymethyl group per glucose unit of the cellulose and between about 0.1 and about 1.0 allyl group per glucose unit of the cellulose.

4. An alkali-metal salt of a polymerizable mixed carboxymethyl and allyl ether of cellulose according to claim 2 containing between about 0.2 and about 1.0 carboxymethyl group per glucose unit of the cellulose and between about 0.1 and about 1.0 allyl group per glucose unit of the cellulose.

5. A polymerizable mixed carboxymethyl and allyl ether of cellulose according to claim 1 containing a total of between about 0.5 and about 2.0 carboxymethyl and allyl groups, the content of the carboxymethyl groups amounting to at least 0.2 per glucose unit of the cellulose.

6. An alkali-metal salt of a polymerizable mixed carboxymethyl and allyl ethers of cellulose according to claim 2 containing a total of between about 0.5 and about 2.0 carboxymethyl and allyl groups, the content of the carboxymethyl groups amounting to at least 0.2 per glucose unit of the cellulose.

7. A polymerizable mixed carboxymethyl and allyl ether of cellulose as defined in claim 3 containing between about 0.2 and about 0.6 carboxymethyl group per glucose unit of the cellulose and between about 0.3 and about 0.6 mol of allyl group per glucose unit of the cellulose.

8. A polymerizable mixed carboxymethyl and allyl ether of cellulose as defined in claim 3 containing between about 0.2 and about 0.6 carboxymethyl group per glucose unit of the cellulose and between about 0.3 and about 0.6 mol of allyl group per glucose unit of the cellulose.

9. A polymerizable water-soluble sodium salt of a mixed carboxymethyl and allyl ether of cellulose containing about 0.27 carboxymethyl group per glucose unit of the cellulose and about 0.53 allyl group per glucose unit of the cellulose.

10. A polymerizable water-soluble sodium salt of a mixed carboxymethyl and allyl ether of cellulose containing about 0.21 carboxymethyl group per glucose unit of the cellulose and about 0.3 allyl group per glucose unit of the cellulose.

11. A polymerizable water-soluble sodium salt of a mixed carboxymethyl and allyl ether of cellulose containing about 0.8 carboxymethyl group per glucose unit of the cellulose and about 1.0 allyl group per glucose unit of the cellulose.

12. The process for the manufacture of a polymerizable mixed cellulose ether and water-soluble salts thereof which comprises etherifying at most two OH groups per glucose unit of a cellulose by mixing in the presence of a strong alkali said cellulose with at least one allyl halide and at least one salt of a monohalogen-substituted acetic acid at elevated temperature not exceeding about 110° C., adding an acid in such amount as to at least neutralize the reaction mixture, washing the reaction product with a lower alcohol, and drying it at a temperature not exceeding 110° C.

13. The process for the manufacture of a polymerizable mixed cellulose ether and water-soluble salts thereof which comprises etherifying at most two OH groups per glucose unit of a cellulose by mixing in the presence of a strong alkali and an aqueous alcohol having from 3 to 5 carbon atoms cellulose with at least one allyl halide and at least one salt of a monohalogen-substituted acetic acid at elevated temperature not exceeding about 110° C., adding an acid in such amount as to at least neutralize the reaction mixture, washing the reaction product with a lower alcohol and drying it at a temperature not exceeding 110° C.

14. The process for the manufacture of a polymerizable mixed cellulose ether and water-soluble salts thereof which comprises etherifying at most two OH groups per glucose unit of a cellulose by mixing at elevated temperature not exceeding about 110° C. an alkali cellulose with a salt of a monohalogen-substituted acetic acid, the alkali content of the said alkali cellulose being in excess over the said salt of a monohalogen-substituted acetic acid and then mixing at elevated temperatures not exceeding about 110° C. the salt of the carboxymethyl cellulose thus obtained with an allyl halide and a strong alkali the said alkali being in excess over the said allyl halide but the ratio of the allyl halide to the alkali not exceeding 1 to 2, adding an acid in such amount as to at least neutralize the reaction mixture, washing the reaction product with a lower alcohol, and drying it at a temperature not exceeding 110° C.

15. The process for the manufacture of a polymerizable mixed cellulose ether and water-soluble salts thereof which comprises etherifying at most two OH groups per glucose unit of a cellulose by mixing at elevated temperature not exceeding about 110° C. an alkali cellulose with a salt of a monohalogen-substituted acetic acid the alkali content of the said alkali cellulose being in excess of the said salt of the monohalogen-substituted acetic acid and then mixing at elevated temperature not exceeding about 110° C. the salt of the carboxyl methyl cellulose thus obtained with an allyl halide and a strong alkali, the said allyl halide being in excess of the said alkali, removing the excess of said allyl halide, adding an acid in such amount as to at least neutralize the reaction mixture, washing the reaction product with a lower alcohol and drying at a temperature not exceeding 110° C.

16. The process for the manufacture of a polymerizable mixed cellulose ether and water-soluble salts thereof which comprises etherifying at most two OH groups per glucose unit of a cellulose by mixing at elevated temperature not exceeding about 110° C. an alkali cellulose with a salt of a monohalogen-substituted acetic acid the alkali content of the said alkali cellulose being in excess of the said salt of the monohalogen-substituted acetic acid and then mixing at elevated temperature not exceeding about 110° C. the salt of the carboxylmethylcellulose thus obtaining with an allyl halide and a strong alkali, the said allyl halide and the alkali being present in about equimolecular amounts, adding an acid in such amount as to at least neutralize the reaction mixture, washing the reaction product with a lower alcohol, and drying it at a temperature not exceeding 110° C.

17. The process for the manufacture of a polymerizable mixed cellulose ether and water-soluble salts thereof which comprises etherifying at most two OH groups per glucose unit of a cellulose by mixing at elevated temperature not exceeding about 110° C. a cellulose with an allyl halide and a strong alkali the said alkali being in excess of the allyl halide and then mixing at elevated temperature not exceeding about 110° C. the allyl cellulose thus obtained with a salt of a monohalogen-substituted acetic acid and an excess of said strong alkali, adding an acid in such amount as to at least neutralize the reaction mixture, washing the reaction product with a lower alcohol, and drying it at a temperature not exceeding 110° C.

18. The process for the manufacture of a polymerizable mixed cellulose ether and water-soluble salts thereof which comprises etherifying at most two OH groups per glucose unit of a cellulose by mixing at elevated temperature not exceeding about 110° C. a cellulose with an allyl halide and a strong alkali, said allyl halide being in excess of the said strong alkali and then mixing at elevated temperature not exceeding about 110° C. the allyl cellulose thus obtained with a salt of a monohalogen-substituted acetic acid and an excess of said strong alkali, removing the excess of said allyl halide, adding an acid in such amount as to at least neutralize the reaction mixture, washing the reaction product with a lower alcohol and drying it at a temperature not exceeding 110° C.

19. The process for the manufacture of a polymerizable mixed cellulose ether and water-soluble salts thereof which comprises etherifying at most two OH groups per glucose unit of a cellulose by mixing at elevated temperature not exceeding about 110° C. cellulose with an allyl halide and a strong alkali, said allyl halide and said strong alkali being in about equimolecular amounts and then mixing at elevated temperature not exceeding about 110° C. the allyl cellulose thus obtained with a salt of a monohalogen-substituted acetic acid and an excess of said strong alkali, adding an acid in such amount as to at least neutralize the reaction mixture, washing the reaction product with a lower alcohol, and drying it at a temperature not exceeding 110° C.

20. The process for the manufacture of a polymerizable mixed cellulose ether and water-soluble salts thereof which comprises etherifying at most two OH groups per glucose unit of a cellulose by mixing at elevated temperature not exceeding about 110° C. cellulose with an allyl halide and a salt of a monohalogen-substituted acetic acid and a strong alkali which is in excess over the said allyl halide and the said salt of a monohalogen-substituted acetic acid, adding an acid in such amount as to at least neutralize the reaction mixture, washing the reaction product with a lower alcohol, and drying it at a temperature not exceeding 110° C.

21. The process for the manufacture of a polymerizable mixed cellulose ether and water-soluble salts thereof which comprises etherifying at most two OH groups per glucose unit of a cellulose by mixing at elevated temperature not exceeding about 110° C. cellulose with an allyl halide and a salt of a monohalogen-substituted acetic acid and a strong alkali, the said allyl halide being in excess of the amount of the said strong alkali not used for the carboxymethylation, removing the excess of said allyl halide, adding an acid in such amount as to at least neutralize the reaction mixture, washing the reaction product with a lower alcohol and drying it at a temperature not exceeding 110° C.

22. The process for the manufacture of a polymerizable mixed cellulose ether and water-soluble salts thereof which comprises etherifying at most two OH groups per glucose unit of a cellulose by mixing at elevated temperature not exceeding about 110° C. an alkali cellulose with from about 0.3 to about 3.0 mols of a salt of a monohalogen-substituted acetic acid, the alkali content of the said alkali cellulose being from about 1.0 to about 4.0 mols and then mixing at elevated temperature not exceeding about 110° C. the salt of the carboxymethylcellulose thus obtained with from about 0.2 to about 7.0 mols of an allyl halide and from about 0.3 to about 10.0 mols of a strong alkali, but the ratio of the allyl halide to the alkali not exceeding 1 to 2, adding an acid in such amount as to at least neutralize the reaction mixture, washing the reaction product with a lower alcohol and drying at a temperature not exceeding 110° C.

23. The process for the manufacture of a polymerizable mixed cellulose ether and water-soluble salts thereof which comprises etherifying at most two OH groups per glucose unit of a cellulose by mixing at elevated temperature not exceeding about 110° C. an alkali cellulose with from about 0.3 to about 3.0 mols of a salt of a monohalogen-substituted acetic acid the alkali content of the said alkali cellulose being from about 1.0 to about 4.0 mols and then mixing at elevated temperature not exceeding about 110° C. the salt of the carboxylmethylcellulose thus obtained with an allyl halide and from about 0.2 to about 4.0 mols of a strong alkali, said allyl halide being present in an amount from about 1.5 to about 10 mols to each mol of the said alkali, removing the excess of said allyl halide, adding an acid in such amount as to at least neutralize the reaction mixture, washing the reaction product with a lower alcohol, and drying at a temperature not exceeding 110° C.

24. The process for the manufacture of a polymerizable mixed cellulose ether and water-soluble salts thereof which comprises etherifying at most two OH groups per glucose unit of a cellulose by mixing at elevated temperature not exceeding about 110° C. an alkali cellulose with from about 0.3 to about 3.0 mols of a salt of a monohalogen-substituted acetic acid the alkali content of the said alkali cellulose being from about 1.0 to about 4.0 mols and then mixing at elevated temperature not exceeding about 110° C. the salt of the carboxylmethylcellulose thus obtained with an allyl halide and a strong alkali, the said allyl halide and the alkali being present in amounts from about 0.3 to about 7.0 mols, adding an acid in such amount as to at least neutralize the reaction mixture, washing the reaction product with a lower alcohol, and drying it at a tempertaure not exceeding 110° C.

25. The process for the manufacture of a polymerizable mixed cellulose ether and water-soluble salts thereof which comprises etherifying at most two OH groups per glucose unit of a cellulose by mixing at elevated temperature not exceeding about 110° C. a cellulose with from about 0.3 to about 7.0 mols of an allyl halide and from about 0.4 to about 10 mols of a strong alkali and then mixing at elevated temperature not exceeding about 110° C. the allyl cellulose thus obtained with from about 0.3 to about 5.0 mols of a salt of a monohalogen-substituted acetic acid and from about 1.0 to about 7.0 mols of a strong alkali, adding an acid in such amount as to at least neutralize the reaction mixture, washing the reaction product with a lower alcohol, and drying it at a temperature not exceeding 110° C.

26. The process for the manufacture of a polymerizable mixed cellulose ether and water-soluble salts thereof which comprises etherifying at most two OH groups per glucose unit of a cellulose by mixing at elevated temperature not exceeding 110° C. a cellulose with an allyl halide and from about 0.2 to about 3.0 mols of a strong alkali, said allyl halide being present in an amount from about 1.5 to about 10 mols to each mol of the said alkali and then mixing at elevated temperature not exceeding about 110° C. the allyl cellulose thus obtained with from about 0.3 to about 5.0 mols of a salt of a monohalogen-substituted acetic acid and from about 1.0 to about 7.0 mols of a strong alkali, removing the excess of said allyl halide, adding an acid in such amount as to at least neutralize the reaction mixture, washing the reaction product with a lower alcohol, and drying it at a temperature not exceeding 110° C.

27. The process for the manufacture of a polymerizable mixed cellulose ether and water-soluble salts thereof which comprises etherifying at most two OH groups per glucose unit of a cellulose by mixing at elevated temperature not exceeding about 110° C. cellulose with an allyl halide and a strong alkali, said allyl halide and said strong alkali being in amounts from about 0.4 to about 7.0 mols and then mixing at elevated temperature not exceeding about 110° C. the allyl cellulose thus obtained with from about 0.3 to about 5.0 mols of a salt of a monohalogen-substituted acetic acid and from about 1.0 to about 7.0 mols of a strong alkali, adding an acid in such amount as to at least neutralize the reaction mixture, washing the reaction product with a lower alcohol and drying it at a temperature not exceeding 110° C.

28. The process for the manufacture of a polymerizable mixed cellulose ether and water-soluble salts thereof which comprises etherifying at most two OH groups per glucose unit of a cellulose by mixing at elevated temperature not exceeding about 110° C. cellulose with from about 0.3 to about 7.0 mols of an allyl halide and from about 0.4 to about 3.0 mols of a salt of a monohalgen-substituted acetic acid and from about 1.2 to about 13 mols of a strong alkali, adding an acid in such amount as to at least neutralize the reaction mixture, and then washing the reaction product with a lower alcohol and drying at a temperature not exceeding 110° C.

29. The process for the manufacture of a polymerizable mixed cellulose ether and water-soluble salts thereof which comprises etherifying at most two OH groups per glucose unit of a cellulose by mixing at elevated temperature not exceeding about 110° C. cellulose with an allyl halide and from about 0.4 to about 3.0 mols of a salt of a monohalogen-substituted acetic acid and from about 1.0 to about 7.0 mols of a strong alkali, the said allyl halide being in excess of said alkali in an amount from about 1.5 to about 10 mols for each mol of said alkali minus the mols of said salt of a monohalogen-substituted acetic acid used, removing the excess of said allyl halide, adding an acid in such amount as to at least neutralize the reaction mixture, washing the reaction product with a lower alcohol, and drying it at a temperature not exceeding 110° C.

30. The process for the manufacture of the water-soluble sodium salt of a polymerizable mixed cellulose ether which comprises etherifying about 1.8 OH groups per glucose unit of cellulose by mixing at 65° C. an alkali cellulose with about 1.2 mols of the sodium salt of monochloroacetic acid, the said alkali cellulose containing about 1.5 mols of sodium hydroxide and then mixing at 60° C. the sodium salt of the carboxymethyl cellulose thus obtained with about 7.0 mols of allyl bromide and about 7.5 mols of sodium hydroxide, neutralizing the reaction mixture with glacial acetic acid, washing the reaction product with methanol, and drying it at 60° C.

31. The process for the manufacture of the water-soluble sodium salt of a polymerizable mixed cellulose ether which comprises etherifying about 0.93 OH groups per glucose unit of cellulose by mixing at 65° C. an alkali cellulose with 0.3 mol of the sodium salt of monochloroacetic acid, the said alkali cellulose containing about 1.0 mol of sodium hydroxide and then mixing at 60° C. the sodium salt of the carboxymethylcellulose thus obtained with about 3 mols of allyl bromide and about 1.0 mol of sodium hydroxide, distilling off the excess of the allyl bromide, neutralizing the reaction mixture with glacial acetic acid, washing the reaction product with an 80% solution of methanol in water, and drying it at 60° C.

32. The process for the manufacture of the water-soluble sodium salt of a polymerizable mixed cellulose ether which comprises etherifying about 0.51 OH groups per glucose unit of cellulose by mixing at 60° C. a cellulose with 2 mols of allyl bromide and with 0.6 mol of sodium hydroxide and then mixing at 65° C. the allyl cellulose thus obtained with about 0.3 mol of sodium salt of monochloroacetic acid and about 1.0 mol of sodium hydrxide, neutralizing the reaction mixture with glacial acetic acid, washing the reaction product with an 80% solution of methanol in water and drying it at 60° C.

References Cited in the file of this patent

UNITED STATES PATENTS

| | | |
|---|---|---|
| 2,618,632 | Klug | Nov. 18, 1952 |
| 2,811,519 | Touey | Oct. 29, 1957 |
| 2,891,056 | Wagner et al. | June 16, 1959 |

UNITED STATES PATENT OFFICE
CERTIFICATE OF CORRECTION

Patent No. 3,071,572            January 1, 1963

Ingo Haidasch et al.

It is hereby certified that error appears in the above numbered patent requiring correction and that the said Letters Patent should read as corrected below.

In the heading to the printed specification, line 3, for "ESTERS" read -- ETHERS --.

Signed and sealed this 28th day of January 1964.

(SEAL)
Attest:
ERNEST W. SWIDER            EDWIN L. REYNOLDS

Attesting Officer            Acting Commissioner of Patents